United States Patent [19]

Yao et al.

[11] Patent Number: 5,424,350

[45] Date of Patent: Jun. 13, 1995

[54] WATER-PERMEABLE AND FIRE-RESISTANT FILM AND A PREPARING METHOD THEREOF

[75] Inventors: Shin-Chuan Yao, Tu Cheng City; Jong-Fu Wu; Kun-Lin Cheng, both of Taipei; Chiu-Hsiung Tsai, Yun Lin Hsien; Farn-Ping Koong, Taipei; Kun-Lung Chuang, Tao Yuan Hsien; Shu-Lan Yao, Yung Ho City; Chin-Liu Liu, Hsin Chuang City, all of Taiwan, Prov. of China

[73] Assignee: China Textile Institute, Taipei Hsien, Taiwan, Prov. of China

[21] Appl. No.: 352,743

[22] Filed: Dec. 2, 1994

Related U.S. Application Data

[62] Division of Ser. No. 195,039, Feb. 14, 1994, Pat. No. 5,393,569.

[51] Int. Cl.$^6$ ............................ C08K 3/10; C08K 5/06
[52] U.S. Cl. ................................. 524/409; 524/370; 524/411; 524/507; 524/871
[58] Field of Search ............... 524/370, 409, 411, 507, 524/871

[56] References Cited

U.S. PATENT DOCUMENTS

| | | | |
|---|---|---|---|
| 4,045,396 | 8/1977 | Morans et al. | 528/72 |
| 4,275,172 | 6/1981 | Barth et al. | 521/112 |
| 4,725,457 | 2/1988 | Ward et al. | 525/417 |
| 4,812,356 | 3/1989 | Meyer et al. | 428/220 |

*Primary Examiner*—Morton Foelak
*Attorney, Agent, or Firm*—Morton J. Rosenberg; David I. Klein

[57] ABSTRACT

A water-permeable and fire-resistant film and the preparing method thereof is disclosed. The water-permeable and fire-resistant film comprises polyurethane resin; a first fire-resistant agent; a second fire-resistant agent, an inorganic fire-resistant agent and an additive agent. The first fire-resistant agent used is selected from the group consisting of paraffine chlorinated, decabromodiphenyl oxide, hexachloro benzene, hexabromo benzene, pentabromo ethyl benzene, pentabromo diphenyl oxide and octabromo diphenyl ether. The second fire-resistant agent used is selected from the group consisting of Sb2O3 and Sb2OS. The surface of the film produced is smooth.

7 Claims, No Drawings

WATER-PERMEABLE AND FIRE-RESISTANT FILM AND A PREPARING METHOD THEREOF

This is a divisional of application Ser. No. 08/195,039 filed on Feb. 14, 1994, now U.S. Pat. No. 5,393,569.

FIELD OF THE INVENTION

This invention relates to a water-permeable and fire-resistant film and the preparing method thereof. In particular, this invention relates to a film with a smooth surface.

BACKGROUND OF THE INVENTION

Polyurethanes is widely known as cushions, pillows, sofa, suitcase, soundproof material. Since polyurethanes do not provide heat-resistant property, the users mix polyurethanes with halogen-included compound, phosphoric compound, organic compound or inorganic compound to increase the fire-resistant effect thereof. However, all of fire-resistant agents used are water soluble and will dissolve in water. Therefore, the film produced lacks the fire-resistant property.

SUMMARY OF THE INVENTION

The object of this invention is to provide a water-permeable and fire-resistant film which has a smooth surface.

The other object of this invention is to provide a water-permeable and fire-resistant film which can eliminate the disadvantages of the prior art and easily prepared.

DETAILED DESCRIPTION OF THE PREFERRED EMBODIMENT

The water-permeable and fire-resistant film of this invention is made of polyurethane resin; a first fire-resistant agent; a second fire-resistant agent, an inorganic fire-resistant agent and an additive agent. The first fire-resistant agent used is selected from the group consisting of paraffine chlorinated, decabromodiphenyl oxide, hexachloro benzene, hexabromo benzene, pentabromo ethyl benzene, pentabromo diphenyl oxide and octabromo diphenyl ether. The second fire-resistant agent selected from the group consisting of $Sb_2O_3$ and $Sb_2O_5$. The weight ratio between the first fire-resistant agent and the second fire-resistant agent is from 1:10 to 10:1. The weight ratio between the first fire-resistant agent and the second fire-resistant agent is from 1:1 to 4:1. The inorganic fire-resistant agent is selected from the group consisting of $Mg(OH)_2$, $MoO_3$, $Al(OH)_3$, P, $CaCO_3$, $CaOAl_2O_3 \cdot 6H_2O$, $MgCO_3$, CuO and $Cu_2O$. The additive agent is selected from the group consisting of Zn, Mg, $ZrO_2$, $TiO_2$, $SiO_2$, SnO, ZnO and $BaB_2O_4$. The amount of the inorganic fire-resistant agent based on the weight of the polyurethane resin is from 5 to 100 wt %. The amount of said additive agent based on the weight of the polyurethane resin is from 2 to 30 wt %.

The present method for preparing water-permeable and fire-resistant film comprises the steps of (a) mixing polyurethane resin with a first fire-resistant agent selected from the group consisting of paraffine chlorinated, decabromodiphenyl oxide, hexachloro benzene, hexabromo benzene, pentabromo ethyl benzene, pentabromo diphenyl oxide and octabromo diphenyl ether; a second fire-resistant agent selected from the group consisting of $Sb_2O_3$ and $Sb_2O_5$; an inorganic fire-resistant agent and an additive agent to form a mixture; (b) grinding said mixture; (c) formulating said mixture to form a coated solution; (d) applying said coated solution to a support; (e) wet-curing said coated solution applied on said support to form a film. The weight ratio between the first fire-resistant agent and the second fire-resistant agent is from 1:10 to 10:1. The weight ratio between the first fire-resistant agent and the second fire-resistant agent is from 1:1 to 4:1. The inorganic fire-resistant agent is selected from the group consisting of $Mg(OH)_2$, $MoO_3$, $Al(OH)_3$, P, $CaCO_3$, $CaOAl_2O_3 \cdot 6H_2O$, $MgCO_3$, CuO and $Cu_2O$. The additive agent is selected from the group consisting of Zn, Mg, $ZrO_2$, $TiO_2$, $SiO_2$, SnO, ZnO and $BaB_2O_4$. The amount of the inorganic fire-resistant agent based on the weight of the polyurethane resin is from 5 to 100 wt %. The amount of said additive agent based on the weight of the polyurethane resin is from 2 to 30 wt %. The wet-curing process of the present method is carried out at a temperature of from 10 to 50"J for 0.5 to 20 minutes.

The present invention will now be described more specifically with reference to the following preferred embodiment. It is to be noted that the following descriptions of the preferred embodiment of this invention are presented herein for the purpose of illustration and description; it is not intended to be exhaustive or to limit the invention to the precise form disclosed.

EXAMPLE 1

The amount of polyurethane and the fire-resistant agents are respectively listed in Table 1.

The reactants listed in Table i can be mixed to form a coating solution. The solution is applied on a support with an amount of 300 g/m2 and was wet-cured at a temperature of 20"J for 10 minutes. After water-washing, the cured-film was drying at a temperature of 140"J. The resulted film was tested according ASTM 2863-74 and LYSSY method at a temperature 40'J and 95%RH. The results of the test are described in Table 1.

EXAMPLES 2-3 AND COMPARED EXAMPLES 1-2

The preparing process of these examples were the same as that of EXAMPLE 1 and the reactants used also listed in Table i. The resulted films of these examples are also described in Table 2.

Viewing the results listed in Table 2, the L.O.I. values of the Examples 1 to 3 are better than that of Compared Example 1 and 2.

TABLE 1

| REACTANTS | EXAMPLE 1 | EXAMPLE 2 | EXAMPLE 3 | COMPARED EXAMPLE 1 | COMPARED EXAMPLE 2 |
|---|---|---|---|---|---|
| polyurethane | 100 g | 100 g | 100 g | 100 g | 100 g |
| paraffine chlorinated | 20 g | 25 g | 22.5 g | 20 g | 0 g |
| Sb2O5 | 5 g | 10 g | 7.5 g | 10 g | 0 g |
| Mg(OH)2 | 10 g | 10 g | 10 g | 0 g | 0 g |
| Al(OH)3 | 10 g | 10 g | 0 g | 0 g | 0 g |

TABLE 1-continued

| REACTANTS | EXAMPLE 1 | EXAMPLE 2 | EXAMPLE 3 | COMPARED EXAMPLE 1 | COMPARED EXAMPLE 2 |
|---|---|---|---|---|---|
| MoO3 | 10 g | 0 g | 0 g | 0 g | 0 g |
| ZnO | 15 g | 15 g | 15 g | 0 g | 0 g |
| ZrO2 | 0 g | 0 g | 10 g | 0 g | 0 g |
| anion surfacant | 2 g | 2 g | 2 g | 2 g | 2 g |
| pigment | 20 g | 10 g | 10 g | 10 g | 20 g |

TABLE 2

| PROPERTIES EXAMPLE | L.O.I. | WATER-PERMEABLE PROPERTIES | SOFTNESS |
|---|---|---|---|
| EXAMPLE 1 | 43 | 9500 | EXCELLENT |
| EXAMPLE 2 | 41 | 9000 | EXCELLENT |
| EXAMPLE 3 | 38 | 9000 | EXCELLENT |
| COMPARED EXAMPLE 1 | 28 | 5000 | GOOD |
| COMPARED EXAMPLE 2 | 24 | 4500 | FAIL |

We claim:

1. A water-permeable and fire-resistant film, comprising polyurethane resin;
a first fire-resistant agent selected from the group consisting of chlorinated paraffine decabromodiphenyl oxide, hexachloro benzene, hexabromo benzene, pentabromo ethyl benzene, pentabromo diphenyl oxide and octabromo diphenyl ether;
a second fire-resistant agent selected from the group consisting of Sb2O3 and Sb2O5;
an inorganic fire-resistant agent; and
an additive agent.

2. A water-permeable and fire-resistant film as claim in claim 1, wherein the weight ratio between said first fire-resistant agent and said second fire-resistant agent is from 1:10 to 10:1.

3. A water-permeable and fire-resistant film as claim in claim 1, wherein the weight ratio between said first fire-resistant agent and said second fire-resistant agent is from 1:1 to 4:1.

4. A water-permeable and fire-resistant film as claim in claim 1, wherein said inorganic fire-resistant agent is selected from the group consisting of Mg(OH)2, MOO3, Al(OH)3, P, CaCO3, CaOAl2O3.6H2O, MgCO3, CuO and Cu2O 5. A water-permeable and fire-resistant film as claim in claim 1, wherein said additive agent is selected from the group consisting of Zn, Mg, SnO, ZnO and BaB2O4.

6. A water-permeable and fire-resistant film as claim in claim I, wherein the amount of said inorganic fire-resistant agent based on the weight of said polyurethane resin is from 5 to 100 wt %.

7. A water-permeable and fire-resistant film as claim in claim 1, wherein the amount of said additive agent based on the weight of said. polyurethane resin is from 2 to 30 wt %.

* * * * *